United States Patent [19]

McGann

[11] 4,073,832
[45] Feb. 14, 1978

[54] GAS SCRUBBER

[75] Inventor: Rodney McGann, Northridge, Calif.

[73] Assignee: Texaco Inc., New York, N.Y.

[21] Appl. No.: 700,622

[22] Filed: June 28, 1976

[51] Int. Cl.² ............................................ B01D 47/10
[52] U.S. Cl. ...................................... 261/118; 55/220;
261/78 A; 261/117; 261/DIG. 54
[58] Field of Search ...................... 261/117, 118, 78 R,
261/78 A, DIG. 54; 55/220, 226

[56] References Cited

U.S. PATENT DOCUMENTS

| 2,797,904 | 7/1957 | Voorheis | 261/118 |
| 3,016,979 | 1/1962 | Schmid | 251/DIG. 54 |
| 3,287,001 | 11/1966 | Harris | 261/DIG. 13 |
| 3,575,807 | 4/1971 | Ripley | 261/118 |
| 3,601,374 | 8/1971 | Wheeler | 261/117 |
| 3,789,585 | 2/1974 | Arnold et al. | 261/118 X |
| 3,804,386 | 4/1974 | Arnold et al. | 261/DIG. 54 |
| 3,841,060 | 10/1974 | Hoad | 261/117 |

FOREIGN PATENT DOCUMENTS

| 1,357,783 | 6/1974 | United Kingdom | 261/118 |
| 114,970 | 4/1918 | United Kingdom | 261/117 |

*Primary Examiner*—Tim R. Miles
*Assistant Examiner*—Gregory N. Clements
*Attorney, Agent, or Firm*—Thomas H. Whaley; Carl G. Ries; Henry C. Dearborn

[57] ABSTRACT

The structure of a gas scrubber for large diameter conduits. It employs an axially located element that forms an annular venturi passage. This eliminates any tendency toward incomplete scrubbing of the gas stream.

2 Claims, 5 Drawing Figures

GAS SCRUBBER

1. Field of the Invention

This invention concerns a gas scrubber structure. It is particularly applicable to a gas scrubber for large diameter conduits, where the conventional type scrubber is ineffective because of coring at the center of the scrubber as the gas passes therethrough.

2. Description of the Prior Art

While gas scrubbers of various forms have been known for a long time, it has been found that in connection with a large diameter gas conduit to which scrubbing is applied, there is a tendency for a gas flowing through the conduit to produce a coring effect. Consequently, scrubbing applied by a conventional venturi structure fails to reach the central portion of the gas stream, and therefore the scrubbing is not adequately effective.

Thus, it is an object of this invention to provide a structure for a gas scrubber that is effective to remove the central coring section of a gas stream by means of the structure of the scrubber. This is accomplished in such a manner as to provide a venturi having annular form. It makes the scrubbing effective for the entire gas stream in large diameter streams.

SUMMARY OF THE INVENTION

Briefly, this invention concerns a scrubber for use in removing entrained solid particles from gases. It comprises in combination a means for forming an annular venturi passage relative to a constant inside diameter conduit adapted for carrying said gases therein, and a means for injecting a liquid transversely of said conduit adjacent to the throat of said annular venturi for removing said solid particles.

Again briefly, the invention concerns a carbon scrubber for removing carbon from a synthesis gas stream. It comprises in combination a ring having a right cylindrical inner surface the diameter of which is equal to the inside diameter of a conduit for said synthesis gas stream. The said ring has an outside diameter sufficient for cooperating with coupling flanges on said conduit. It also comprises a tear shaped plug coaxially located centrally of said ring for forming an annular venturi passage for said synthesis gas stream, and a plurality of radial struts for supporting said plug in said ring. The said struts are streamlined for minimizing flow disturbance in said gas stream. The scrubber also comprises a pair of manifolds in said ring for supplying water for scrubbing said stream, and a plenum centrally located in said plug. It also comprises passages inside said struts for connecting one of said manifolds to said plenum. It also comprises a first plurality of ports located peripherally on said plug and connected to said plenum for spraying water outward into the throat of said annular venturi passage, and a passage from said plenum to the nose of said plug for keeping the front surfaces wet and clean. In addition, it comprises a second plurality of ports located on the inside of said ring radially opposite said first ports and connected to the other of said pair of manifolds.

Once more briefly, the invention concerns a carbon scrubber for removing carbon from a synthesis gas stream. It comprises in combination a ring having a right cylindrical inner surface the diameter of which is equal to the inside diameter of a conduit for said synthesis gas stream. The said ring has an outside diameter sufficient for cooperating with coupling flanges on said conduit. The scrubber also comprises an annular plug having a streamlined cross-sectional shape for forming both an annular and an axial venturi passage for said synthesis gas stream, and a plurality of radial struts for supporting said plug coaxially in said ring. The said struts are streamlined for minimizing flow disturbance in said gas stream. The scrubber also comprises a pair of manifolds in said ring for supplying water for scrubbing said gas stream, and an annular plenum centrally located in said plug annulus. It also comprises passages inside said struts for connecting one of said manifolds to said annular plenum. In addition, it comprises a first plurality of ports comprising two sets of ports located peripherally on the inner and outer surfaces of said annular plug and both sets connected to said annular plenum for spraying water radially inward and outward into the throats of said venturi passages. It also comprises a plurality of passages from said annular plenum to the leading edge of said annular plug for keeping the front annular surface wet and clean, and a second plurality of ports located on the inside of said ring radially opposite the outer set of said first ports and connected to the other of said pair of manifolds.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

As has been indicated above, a scrubber according to this invention is particularly applicable to large diameter conduits of a size such that the conventional type of structure which involves some venturi action, fails to have the liquid which is applied for scrubbing the gas, reach the center of the stream. In other words, in the situation where the conduit for the gas has a large diameter, there is a tendency to create a coring action in the gas stream. This causes conditions such that incomplete scrubbing takes place.

Figure 1:
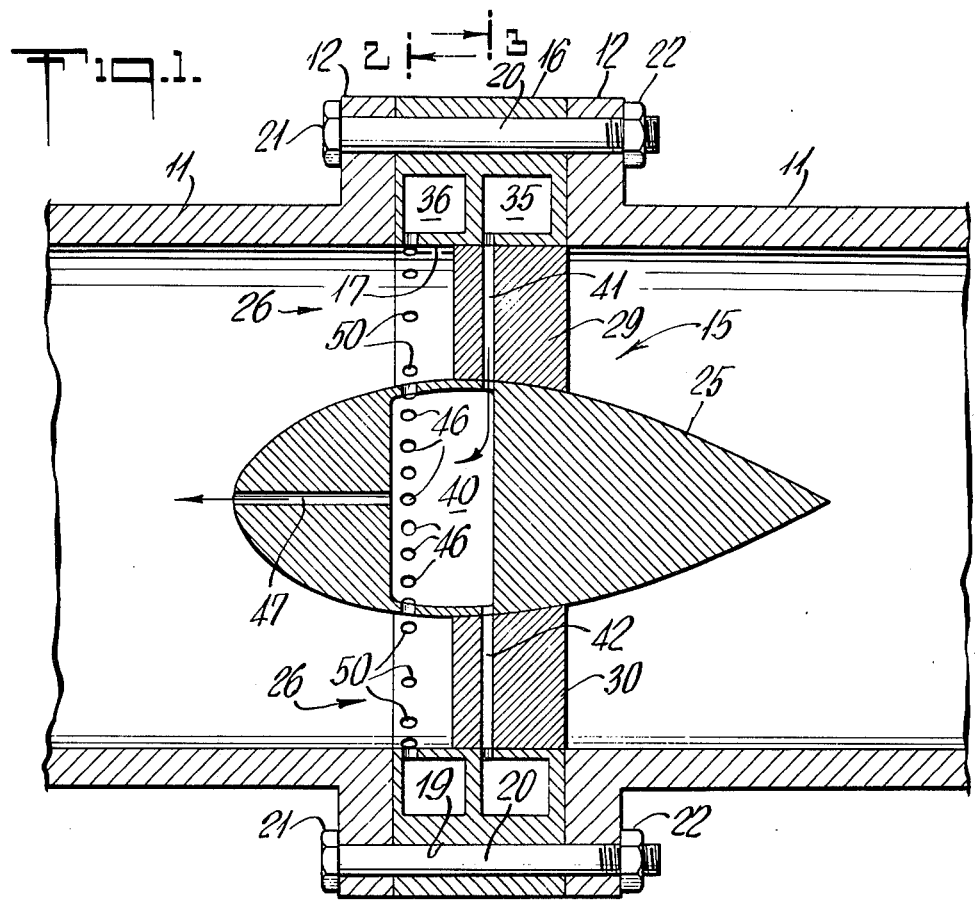
FIG. 1 is a cross-sectional view showing a scrubber according to the invention, mounted in a conduit that carries the gas to be scrubbed.
Figures 2, 3:
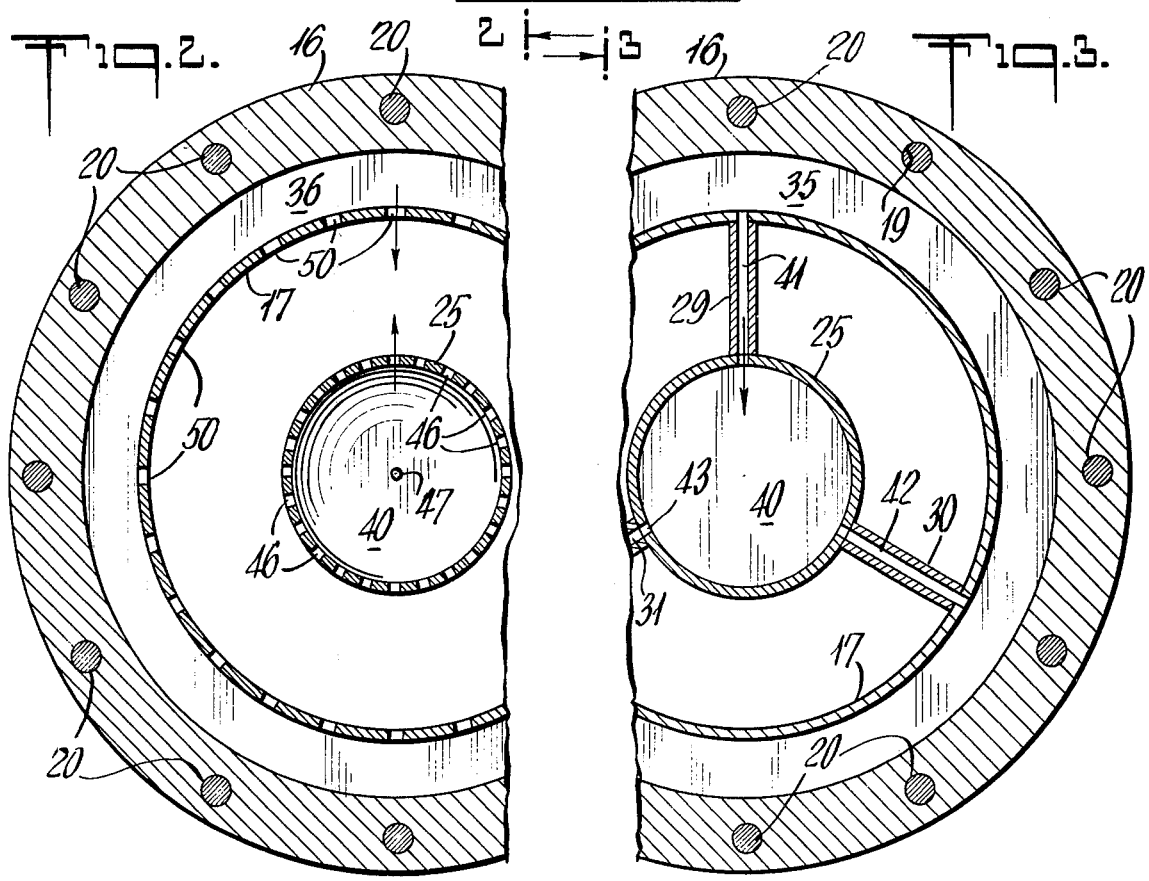
FIG. 2 is a partial transverse cross-sectional view, taken along the lines 2—2 on FIG. 1 and looking in the direction of the arrows.
FIG. 3 is another partial transverse cross-sectional view, taken along the lines 3—3 of FIG. 1 and looking in the direction of the arrows which is opposite to direction of the view of FIG. 2.
Figure 4:
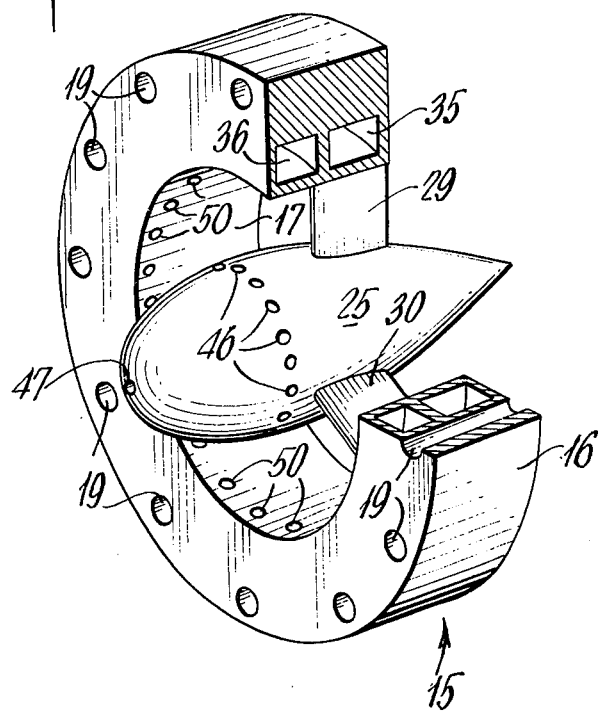
FIG. 4 is a perspective view, partially cut away in cross-section and illustrating the scrubber structure per se.

One embodiment of a scrubber structure according to this invention is illustrated in FIGS. 1-4. With particular reference to FIG. 1, it will be observed that there is a conduit 11 shown that has coupling flanges 12 on the ends thereof. A scrubber unit 15 is made up of a ring 16 that has a right cylindrical inner surface 17. The diameter of the inner surface 17 is equal to the inside diameter of the conduit 11, into which the scrubber unit 15 is mounted.

The outside diameter of the ring 16 is large enough to cooperate with the flanges 12 of the conduit 11. Thus, the ring 16 will be mounted with a fluid tight contact between it and the flanges 12 of the conduit 11. This may be done in any feasible manner, for example by means of a plurality of bolts 20 that pass through holes 19 which are spaced around the periphery of the flanges 12, and of course correspondingly spaced around the edge of the ring 16. The illustrated bolts 20 have hexagonal bolt heads 21, and hexagonal nuts 22 which are threaded onto the other end of the bolts.

There is a tear shaped plug 25 that is coaxially located within the ring 16. Also it is generally centered longitudinally for relatively steady support therein.

It will be observed that the plug 25 because of its tear shaped exterior surface, will create a venturi passage of annular form within the conduit 11 and the connecting inner surface 17. Such annular venturi passage is designated by reference numeral 26 in FIGS. 1 and 4. It will be a understood that there is a change in the cross-sectional area of the annular passage 26 as it exists within the conduit 11. Thus, the cross-sectional area of the venturi passage (annular) is reduced and then expanded again to the full unimpeded area on the down stream side of the venturi passage.

A reduction in cross-section area of a fluid conduit is a well known construction for creating venturi action. However, it has been conventional to reduce the diameter of the conduit and then enlarge it again, in order to obtain the velocity and pressure changes which were discovered by G. B. Venturi in the nineteenth century.

In this invention there is an annular venturi passage to cause the flowing gas stream within conduit 11 to accelerate at the smaller cross sectional area, and slow down once more on the other side. The higher velocity portion of the gas stream has a lower pressure in accordance with the known attributes of a venturi passage, and consequently it is at this point that the scrubbing action is most effective.

There are three radially oriented struts 29, 30 and 31 which attach the plug 25 to the ring 16 of the scrubber. It will noted that these struts 29–31 are streamlined in their exterior configuration, so as to create a minimum of disturbance to the flow of high temperature gases through the scrubber.

Within the ring 16 there are a pair of manifolds 35 and 36 which are for supplying water to be sprayed in connection with the scrubbing of the gas passing through the scrubber. It will be appreciated that any feasible means of connection (not shown) for the water supply as necessary, may be provided. Presumably it would be through the outside edge of the ring 16. No particular showing for such a supply passageway has been made.

Centrally located within the plug 25 there is a plenum 40 which is connected to the manifold 35 by passages 41, 42 and 43 which are located within each of the struts 29, 30 and 31 respectively. These passages connect the water supply to the plenum 40 from the manifold 35.

There is a first plurality of ports 46 that are located peripherally on the lug 25. They connect into the plenum 40 for spraying water outward into the throat of the annular venturi passage 26. There is also a single passage 47 that goes out from the plenum 40 to the nose of the plug 25. This passage is for supplying a small amount of water to wet the front surfaces of the plug and keep them clean.

There is a second plurality of ports 50 which are located on the inside surface 17 of the ring 16. They are located radially opposite the first plurality of ports 46. The ports 50 connect into the manifold 36, so that water will be sprayed inward opposite the spray coming outward through the ports 46.

Similarly as indicated in connection with the manifold 35, it will be appreciated that the manifold 36 will have some connection (not shown) for supplying water thereto. It may be that the water supply is connected jointly to manifolds 35 and 36 in parallel. But, if desired they may be separately supplied for controlling the amount and pressure of water being supplied to each individually. Such supply connections to the manifolds 35 and 36 have not been illustrated.

Figure 5:
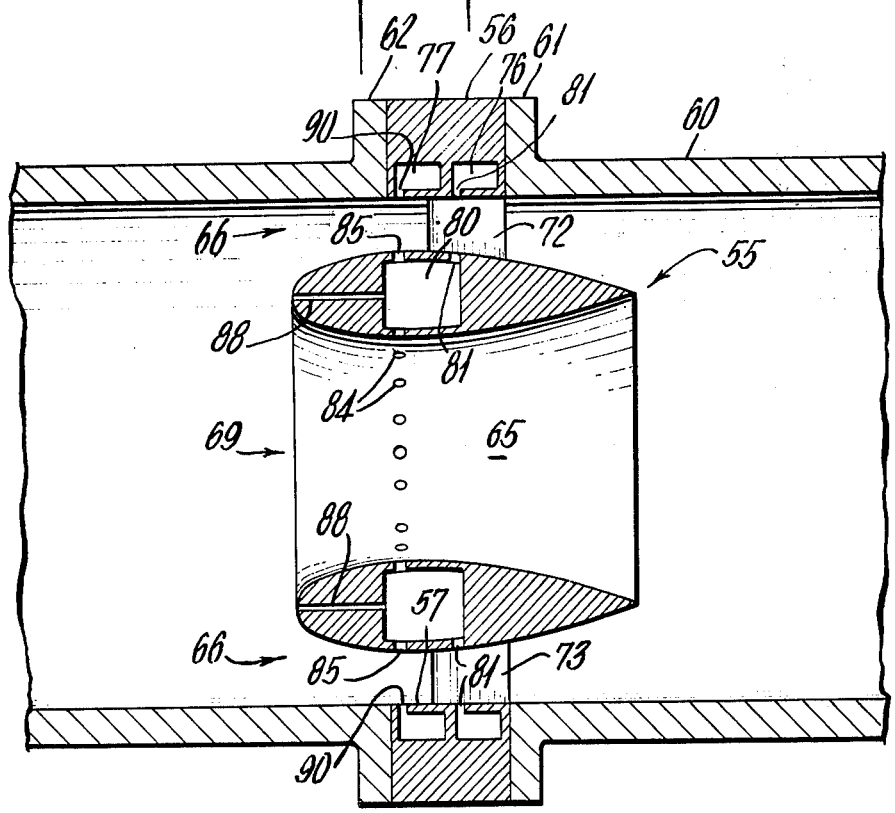
FIG. 5 is a longitudinaly cross-sectional view, illustrating another embodiment of a scrubber according to the invention, shown mounted in a conduit that carries the gas to be scrubbed.

FIG. 5 illustrates modification of a scrubber according to the invention. This scrubber unit 55 has elements which are quite similar to those of the FIGS. 1–4 modification. The major differences lie in the structure of the plug. Thus, there is a ring 56 that has a right cylindrical inner surface 57 which has a diameter equal to the inside diameter of a conduit 60. Conduit 60 has flanges 61 and 62 which are coupled onto the edges of the ring 56 in any feasible manner (not shown). Ordinarily the outside surface of the ring 56 will be substantially the same size in diameter as the edges of the flanges 61 and 62.

There is an annular plug 65 that has a streamlined cross-sectional shape so that it forms an annular venturi passageway 66 between the outside of the plug 65 and the inside walls of the conduit 60 and the surface 57 of the ring 56. Also, the inside streamlined surfaces of the plug 65 form an axially located venturi passage 69. It is coaxial relative to the conduit 60.

There is a plurality of radial struts 72 and 73 which have streamlined outer surfaces for reducing any turbulance in the flowing gas stream in the outer annular venturi passage 66.

The ring 56 contains a pair of manifolds 76 and 77 which have connections (not shown) for connecting a water supply to be distributed via these manifolds. This would be in the same manner as the structure which was indicated above in connection with the FIGS. 1–4 modification.

There is an annular plenum 80 that is located centrally within the thickest part of the annular plug 65. There are passageways 81 that connect the plenum 80 with the manifold 76. These are located inside of the struts 72 and 73.

There is one set of a plurality of ports 84 that are located peripherally on the inner surface of the inside venturi passage 69. These have their axes located radially through the inside surface of the plug 65 and they connect into the plenum 80.

There is a second set of ports 85 that also connect to the plenum 80. However, these are located peripherally on the outside surface of the plug 65. It will be observed that these two sets of ports 84 and 85 direct water flowing out from the plenum 80 into the throat of the venturi passages 66 and 69.

In addition, there are a plurality of passages 88 which connect the leading edge of the annular plug 65 with the annular plenum 80. This permits a flow of water onto the leading edge, or nose section of the annular plug 65 in order to keep it wet and clean.

There is a second plurality of ports 90 which connect the manifold 77 with the inside surface of the ring 56, so as to provide the desired spraying action of water from the manifold 77 into the throat of the annular venturi passage 66. These ports 90 are located radially opposite the ports 85 in the plug 65.

As in connection with the first modification, it will be appreciated that the manifolds 76 and 77 may be separately connected to a source of water for controlling the quantity and pressure of the flow in each case in an individual manner, if this is desired. However, it may be satisfactory to have them connected together in any feasible manner (not shown).

It will be understood that the FIG. 5 modification acts like the FIGS. 1-4 modification, to avoid the undesirable coring action of a scrubber in a large diameter conduit. In the FIG. 5 case it is accomplished by reducing the size of the conduit cross-sectional area by providing a combined small venturi passage with an annular venturi passage in parallel therewith.

While particular embodiments of the invention have been described above in considerable detail in accordance with the applicable statutes, this is not to be taken as in any way limiting the invention but merely as being descriptive thereof.

I claim:

1. A carbon scrubber for removing carbon from a synthesis gas stream, comprising in combination
    a ring having a ring cylindrical inner surface the diameter of which is equal to the inside diameter of a conduit for said synthesis gas stream,
    said ring having an outside diameter sufficient for cooperating with coupling flanges on said conduit,
    a tear shaped plug coaxially located centrally of said ring for forming an annular venturi passage for said synthesis gas stream,
    a plurality of radial struts for supporting said plug in said ring,
    said struts being streamlined for minimizing flow disturbance in said gas stream,
    a pair of manifolds in said ring for supplying water for scrubbing said gas stream,
    a plenum centrally located in said plug,
    passages inside said struts for connecting one of said manifolds to said plenum,
    a first plurality of ports located peripherally on said plug and connected to said plenum for spraying water outward into the throat of said annular venturi passage,
    a passage from said plenum to the nose of said plug for keeping the front surfaces wet and clean, and
    a second plurality of ports located on the inside of said ring radially opposite said first ports and connected to the other of said pair of manifolds.

2. A carbon scrubber for removing carbon from a synthesis gas stream, comprising in combination
    a ring having a right cylindrical inner surface the diameter of which is equal to the inside diameter of a conduit for said synthesis gas stream,
    said ring having an outside diameter sufficient for cooperating with coupling flanges on said conduit,
    an annular plug having a streamlined cross sectional shape for forming both an annular and an axial venturi passage for said synthesis gas stream,
    a plurality of radial struts for supporting said plug coaxially in said ring,
    said struts being streamlined for minimizing flow disturbance in said gas stream,
    a pair of manifolds in said ring for supplying water for scrubbing said gas stream,
    an annular plenum centrally located in said plug annulus,
    passages inside said struts for connecting one of said manifolds to said annular plenum,
    a first plurality of ports comprising two sets of ports located peripherally on the inner and outer surfaces of said annular plug and both sets connected to said annular plenum for spraying water radially inward and outward into the throats of said venturi passages,
    a plurality of passages from said annular plenum to the leading edge of said annular plug for keeping the front annular surface wet and clean, and
    a second plurality of ports located on the inside of said ring radially opposite the outer set of said first ports and connected to the other of said pair of manifolds.

* * * * *

UNITED STATES PATENT AND TRADEMARK OFFICE
CERTIFICATE OF CORRECTION

PATENT NO. : 4,073,832
DATED : February 14, 1978
INVENTOR(S) : Rodney McGann

It is certified that error appears in the above-identified patent and that said Letters Patent are hereby corrected as shown below:

In Col. 5, line 27, "ring" (second occurrence) should read -- right --.

Signed and Sealed this

Fifth Day of December 1978

[SEAL]

Attest:

RUTH C. MASON
Attesting Officer

DONALD W. BANNER
Commissioner of Patents and Trademarks